United States Patent [19]

Klein

[11] 4,142,424
[45] Mar. 6, 1979

[54] REMOTE CONTROL MIRROR

[75] Inventor: Donald R. Klein, Greenville, Ohio

[73] Assignee: Sheller-Globe Corporation, Toledo, Ohio

[21] Appl. No.: 837,811

[22] Filed: Sep. 29, 1977

[51] Int. Cl.² ............................................... F16C 1/10
[52] U.S. Cl. ................................................. 74/501 M
[58] Field of Search ............ 74/501 R, 501 M, 501 P

[56] References Cited

U.S. PATENT DOCUMENTS

| | | | |
|---|---|---|---|
| 3,550,456 | 12/1970 | Pringle | 74/501 M |
| 3,877,780 | 4/1975 | Taylor | 74/501 M |
| 3,933,058 | 1/1976 | Kraine | 74/501 M |
| 3,966,162 | 6/1976 | Hadley | 74/501 M |
| 4,084,886 | 4/1978 | Grosch | 74/501 M X |

*Primary Examiner*—Leonard H. Gerin

*Attorney, Agent, or Firm*—Barnes, Kisselle, Raisch & Choate

[57] ABSTRACT

A remote control mirror comprising a mirror support, a base, a trunnion, interengaging means between the trunnion and the base limiting the pivotal movement of the trunnion with respect to the base in a single plane about a first axis, and interengaging means between the trunnion and mirror support limiting the pivotal movement of the mirror support about a second axis at a right angle to the first axis. The interengaging means between the base and the trunnion comprises spaced angularly related surfaces on the base engaged by spaced arcuate surfaces on the trunnion. The mirror construction further includes cable means acting on the mirror support for selectively moving said mirror support into any desired position by the combined pivotal movement about each of the axes.

4 Claims, 19 Drawing Figures

U.S. Patent  Mar. 6, 1979  Sheet 1 of 3  4,142,424
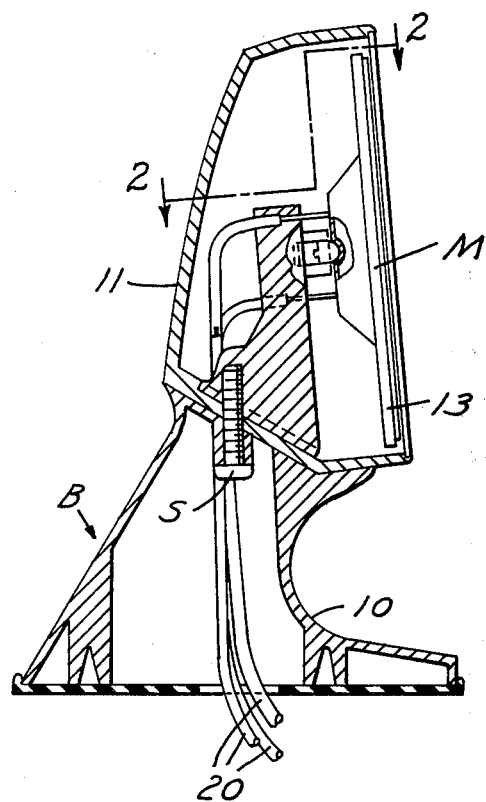
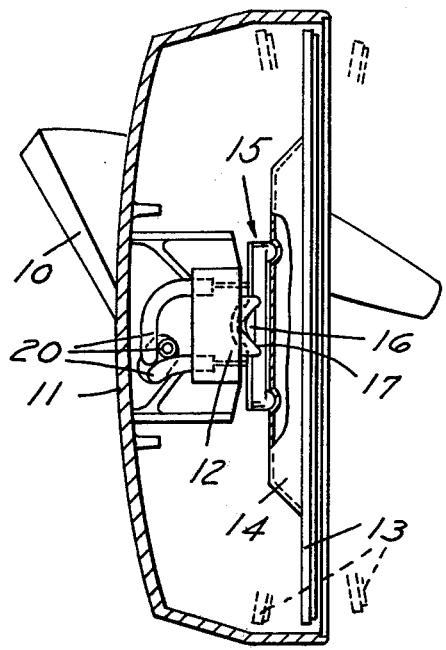
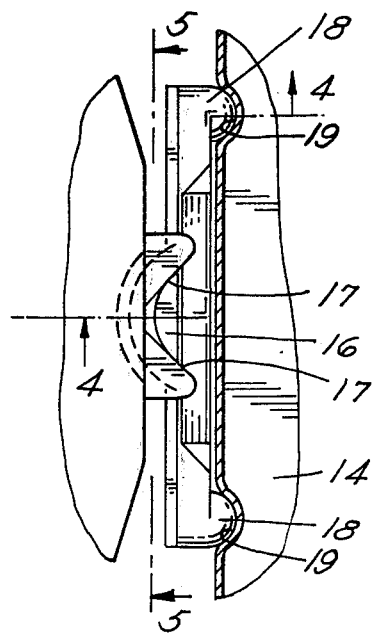
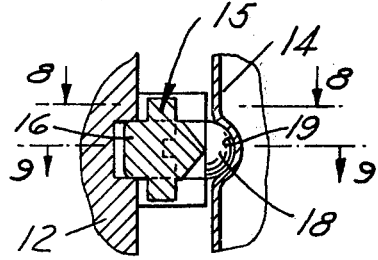
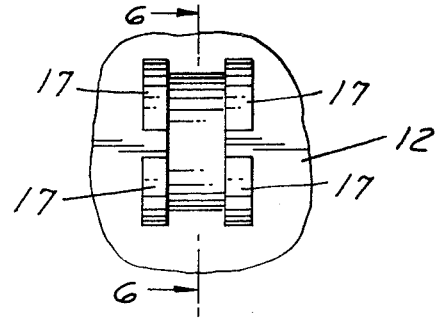

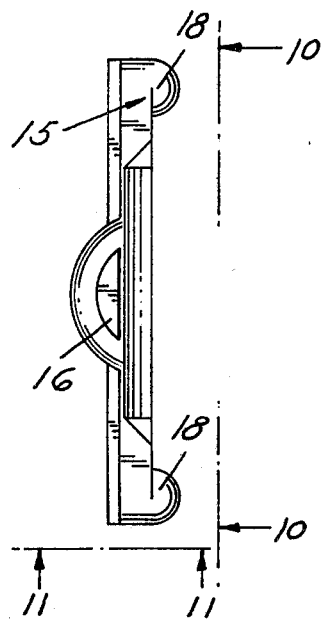
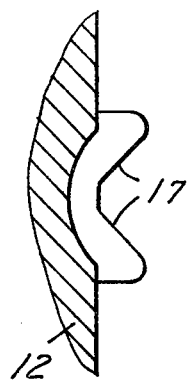
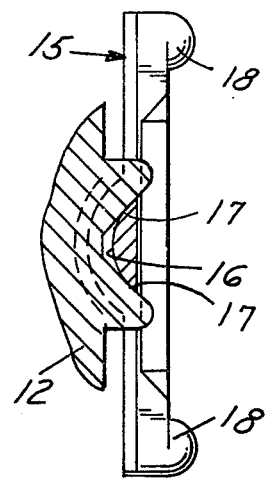
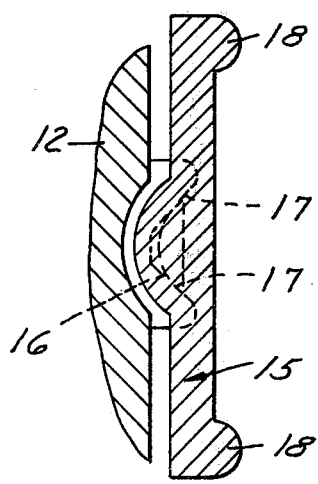
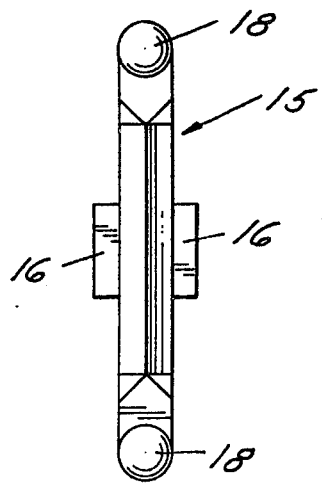
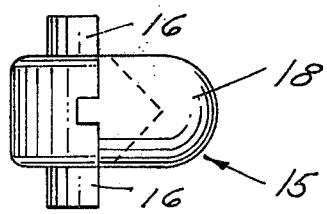

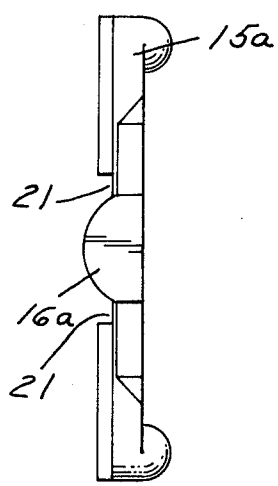
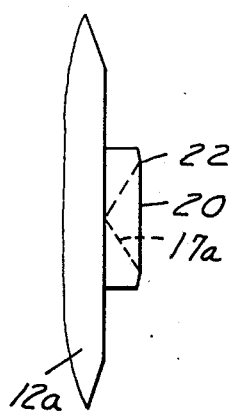
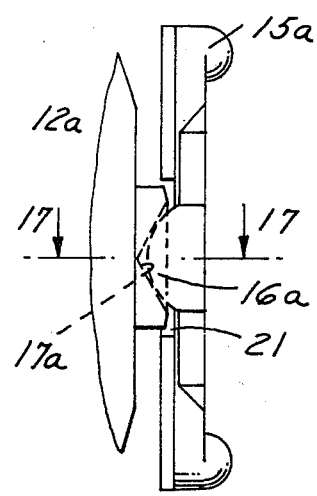
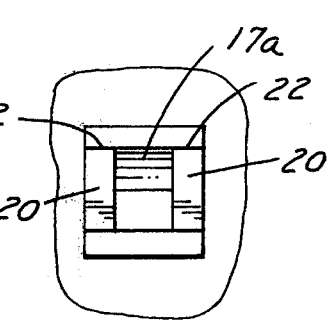
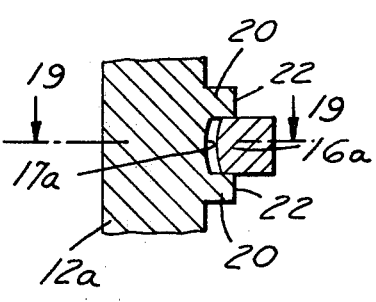
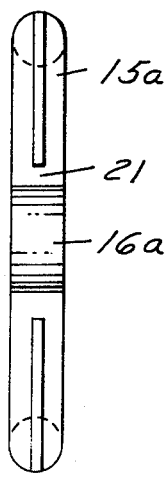
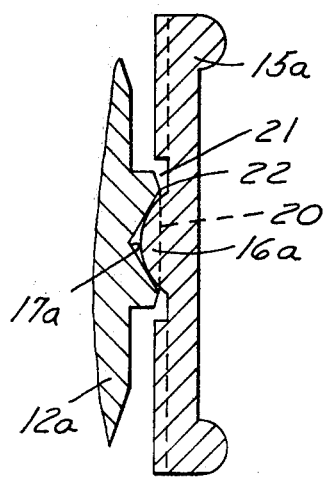

REMOTE CONTROL MIRROR

This invention relates to remote control mirrors and particularly to such mirrors which have a non-circular periphery.

BACKGROUND OF THE INVENTION

In a common type of remote contrllled mirror used on automobiles and the like, the mirror is supported on a mirror support that is usually mounted by a ball and socket connection and spaced cables extend from the mirror support to a remote control for operating and adjusting the mirror support and, in turn, the mirror. One of the problems with such a mirror, especially where the mirror is generally rectangular rather than circular, is that the mirror tends to vibrate and rotate in the plane of the mirror. It has heretofore been suggested that spaced projections be provided on the mirror support which extend into openings of a plastic device to tend to prevent rotation of the mirror in the plane of the mirror. However, such a construction has not proven completely satisfactory. Specifically, mirror travel is restricted in the 1:30, 4:30, 7:30 and 10:30 positions of the mirror.

In U.S. Pat. No. 3,780,598 there is disclosed and claimed a remote control mirror comprising a mirror support, a base, a trunnion, interengaging means between the trunnion and the base limiting the pivotal movement of the trunnion with respect to the base in a single plane about a first axis, and interengaging means between the trunnion and mirror support limiting the pivotal movement of the mirror support about a second axis at a right angle to the first axis. The mirror construction further includes cable means acting on the mirror support for selectively moving said mirror support into any desired position by the combined pivotal movement about each of the axes.

The present invention is directed to an improved remote control mirror of the type shown in aforementioned U.S. Pat. No. 3,780,598 which effectively provides proper operation with improved smoothness of action and ease of operation.

In accordance with the invention, the interengaging means between the base and the trunnion comprises angularly related surfaces engaged by spaced arcuate surfaces on the trunnion.

DESCRIPTION OF THE DRAWINGS

FIG. 1 is a horizontal sectional view of a remotely controlled mirror embodying the invention.

FIG. 2 is a sectional view taken along the line 2—2 in FIG. 1.

FIG. 3 is an enlarged sectional view of a portion of the mirror shown in FIG. 2.

FIG. 4 is a fragmentary sectional view taken along the line 4—4 in FIG. 3.

FIG. 5 is a fragmentary sectional view taken along the line 5—5 in FIG. 3, parts being broken away.

FIG. 6 is a fragmentary view taken along the line 6—6 in FIG. 5.

FIG. 7 is a plan view of the trunnion.

FIG. 8 is a fragmentary sectional view taken along the line 8—8 in FIG. 4.

FIG. 9 is a fragmentary sectional view taken along the line 9—9 in FIG. 4.

FIG. 10 is a view taken along line 10—10 in FIG. 7

FIG. 11 is a view taken along the line 11—11 in FIG. 7.

FIG. 12 is a side elevational view of a part of a modified form of the invention.

FIG. 13 is a fragmentary side elevational view of another part of the modified form of the invention.

FIG. 14 is a fragmentary side elevational view of the modified form of the invention.

FIG. 15 is a longitudinal sectional view of the part shown in FIG. 12.

FIG. 16 is a fragmentary plan view of the part shown in FIG. 13.

FIG. 17 is a fragmentary sectional view taken along the line 17—17 in FIG. 14.

FIG. 18 is a plan view of the part shown in FIG. 12.

FIG. 19 is a fragmentary sectional view taken along the lines 19—19 in FIG. 17.

DESCRIPTION

Referring to FIGS. 1 and 2, the mirror embodying the invention comprises a metal base B including a stanchion 10 which is adapted to be fixed to the exterior of the vehicle, for example, on the door and a metal base bracket 12 fixed on the base. A metal shell 11 is interposed between stanchion 10 and base bracket 12 surrounding base bracket 12. Stanchion 10, shell 11 and base bracket 12 are held in assembled relation by a screw S.

The mirror M of flat glass or the like, is generally rectangular and is fixed on a metal mirror support 13 having a central portion 14 spaced from the flat mirror. A metal trunnion 15 is provided and has spaced arcuate surfaces 16 engaging spaced pairs of angularly related flat surfaces 17 at an acute angle to one another in the base bracket 12. The construction provides interengaging means between the trunnion 15 and base bracket 12 that limits pivotal movement of the trunnion about a single axis corresponding to the center of the radius of curvature of the groove defined by surfaces 17.

The trunnion 15 is further provided with projections 18 that are spaced from one another on each side of the center of the radius of curvature of the portion 16 and are sperical. These engage complementary depressions 19 in the portion 14 of mirror support 13 and thereby limits pivotal movement of the mirror support 13 with respect to the trunnion 15 about a second axis that is at a right angle to the axis of the center of the groove 17.

Three Bowden cables 20 extend from a single handle control (not shown) to spaced points on the mirror back in accordance with conventional construction.

In order to adjust the position of the mirror, the remote control is actuated to cause the cable to pivot the mirror about one of both of the axes to the desired position.

The construction provides for a mirror mount wherein fluttering and vibration are minimized and at the same time rotation of the mirror in the plane of the mirror is obviated. The mirror can be adjusted to any position without restriction. The construction of the pivot structure is such that it is of minimum size and is not adversely affected by wear of the component parts.

In the form of the invention shown in FIGS. 12-19, the mirror mount of FIGS. 1-11 is modified so that the trunnion 15a has the central portion 16a modified so that it comprises one surface 16a, instead of two surfaces 16, as in the previous form of the invention, which surface 16a engages a single pair of angularly related surfaces 17a in the base 12a. Integral walls 20 extend outwardly from the base 12a and function to prevent movement of the trunnion 15a axially with respect to the center of curvature of the portion 16a. The trunnion 15a includes recesses 21 adjacent the extremities of surface 16a into which the ends 22 of the walls 20 extend providing proper clearance to permit the desired angular movement between the trunnion 15a and the base 12a. In this form of the invention, the adjustment of the mirror is achieved in the same manner as in the previously described form of the invention.

I claim:

1. In a remote control mirror, the combination comprising a mirror support,
a base,
a trunnion,
interengaging means between the trunnion and the base limiting the pivotal movement of the trunnion with respect to the base in a single plane about a first axis,
interengaging means between the trunnion and mirror support limiting the pivotal movement of the mirror support with respect to the trunnion about a second axis at a right angle to the first mentioned axis,
and means acting on said mirror back for selectively moving said mirror back into any desired position by the combined pivotal movement about each of said axes,
said first-mentioned interengaging means comprising spaced pairs of angularly related flat surfaces,
said trunnion having spaced arcuate surfaces engaging said spaced pairs of surfaces.

2. The combination set forth in claim 1 wherein said interengaging means between said trunnion and said mirror support comprises spaced depressions on said mirror support engaged by portions on said trunnion.

3. In a remote control mirror, the combination comprising a mirror support,
a base,
a trunnion,
interengaging means between the trunnion and the base limiting the pivotal movement of the trunnion with respect to the base in a single plane about a first axis,
interengaging means between the trunnion and mirror support limiting the pivotal movement of the mirror support with respect to the trunnion about a second axis at a right angle to the first mentioned axis,
and means acting on said mirror back for selectively moving said mirror back into any desired position by the combined pivotal movement about each of said axes,
said first-mentioned interengaging means comprising a pair of angularly related flat surfaces,
said trunnion having an arcuate surface engaging said pair of surfaces.

4. The combination set forth in claim 3 including spaced walls adjacent said pair of angularly related surfaces limiting the movement of the said trunnion axially of said arcuate surface.

* * * * *